United States Patent [19]

Schmidt et al.

[11] Patent Number: 6,136,083
[45] Date of Patent: *Oct. 24, 2000

[54] COATED INORGANIC PIGMENTS, PROCESS FOR THEIR PRODUCTION AND THEIR USE

[75] Inventors: Helmut Schmidt, Saarbrücken-Güdingen; Martin Mennig, Quierschied; Axel Kalleder, Saarbrücken-Dudweiler, all of Germany

[73] Assignee: Institut fuer Neue Materialien gemeinnuetzige GmbH, Saarbruecken, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,975
[22] PCT Filed: May 10, 1996
[86] PCT No.: PCT/EP96/02017
§ 371 Date: Dec. 8, 1997
§ 102(e) Date: Dec. 8, 1997
[87] PCT Pub. No.: WO96/41840
PCT Pub. Date: Dec. 27, 1996

[30] Foreign Application Priority Data

Jun. 8, 1995 [DE] Germany .......................... 195 20 964

[51] Int. Cl.$^7$ ................ C09C 3/06; C09C 1/00; C04B 33/14
[52] U.S. Cl. .................. 106/403; 427/215; 427/216; 427/219; 427/213.3; 427/213.31; 428/363; 428/404; 428/403; 106/401; 106/415; 106/417; 106/419; 106/431; 106/432; 106/434; 106/435; 106/436; 106/442; 106/430; 106/453; 106/454; 106/455; 106/456; 106/457
[58] Field of Search ............... 501/12, 32; 427/215, 427/216, 219, 213.3, 213.31; 428/363, 404, 403; 106/401, 403, 415, 417, 419, 420, 422, 423, 425, 426, 429, 431, 432, 435, 436, 442, 446, 450, 453, 456, 457, 461, 465, 469, 466, 472, 475, 474, 480, 481, 489

[56] References Cited

U.S. PATENT DOCUMENTS

| | | | |
|---|---|---|---|
| 4,806,428 | 2/1989 | Cooper et al. | 428/403 |
| 5,194,089 | 3/1993 | Speer et al. | 106/426 |
| 5,261,995 | 11/1993 | Nadkarni | 106/404 |
| 5,269,840 | 12/1993 | Morris et al. | 106/437 |

FOREIGN PATENT DOCUMENTS

| | | |
|---|---|---|
| 455933 | 11/1991 | European Pat. Off. . |
| 665004 | 8/1995 | European Pat. Off. . |
| 2424599 | 12/1974 | Germany . |

OTHER PUBLICATIONS

Derwent abstract 95–220,736: abstract for JP 7–133211, Nov. 1993.

Derwent abstract 85–137874: abstract for JP 6–72963, Apr. 1985.

Derwent abstract 90–62693: abstrct for JP 2–14819, Jan. 1990.

Chemical Abstract citation No. 123:92931: abstract for JP 7–133,211, Nov. 1993.

*Primary Examiner*—C. Melissa Koslow
*Attorney, Agent, or Firm*—Oblon, Spivak, McClelland, Maier & Neustadt, P.C.

[57] ABSTRACT

A description is given of coated inorganic pigments comprising an organic pigment which has a coating, prepared by the sol-gel process from glass-forming components and densified to form a xerogel or glass, having a layer thickness of at least 0.8 μm. These pigments are prepared by spray drying a sol-pigment dispersion, followed if desired by thermal densification of the xerogel layer to form a glass layer. The coated pigments are suitable for producing enamels and moldings.

19 Claims, No Drawings

COATED INORGANIC PIGMENTS, PROCESS FOR THEIR PRODUCTION AND THEIR USE

BACKGROUND OF THE INVENTION

1. Field of the Invention

The invention relates to coated inorganic pigments, to a process for their preparation by the sol-gel process and to their use for the production of enamels and mouldings.

2. Description of the Background

It is already known to apply one-component (e.g. $SiO_2$) or multi-component glass coats to planar substrates by the sol-gel process; see, for example, DE 3719339, DE 4117041 and DE 4217432. Also, it is known to provide inorganic particles with ceramic coatings by means of the sol-gel process. For example, $SiO_2$ particles can be coated with a $ZrO_2$ layer, or copper chromium spinel particles with a layer of mullite. The layer thickness of the coating in these cases is within the nm range up to about 100 nm. However, thin layers of this kind are unsuitable for protecting redox-sensitive inorganic pigments against oxidation or reduction processes at temperatures in the range from 500 to 700° C., as are employed for the production of enamels, since these layers are unable effectively to suppress the diffusion of gaseous substances. In addition, the very thin coatings break up within a short time in the presence of aggressive glass melts, as are used, for example, for enamel decorations on glassware, and as a result the pigment decomposes, with a change in colour, or is dissolved in the glass matrix.

SUMMARY OF THE INVENTION

It has surprisingly now been found that it is possible, by means of the sol-gel process, to produce intact glass-forming layers on inorganic pigments, whose layer thickness is more than one order of magnitude above that of conventional products.

The invention therefore provides coated inorganic pigments comprising an inorganic pigment which has a coating, prepared by the sol-gel process from glass-forming components and densified to form a xerogel or glass, with a layer thickness of at least 0.8 μm, preferably from 1 to 5 μm.

The invention additionally provides a process for the preparation of these coated inorganic pigments, which is characterized in that a) one or more glass-forming components are reacted to form a sol by the sol-gel process, b) an inorganic pigment or a pigment precursor is dispersed in the resulting sol, c) the sol-pigment dispersion is converted by spray drying into a coated inorganic pigment which has a xerogel coating, and d) if desired, the xerogel coating is densified by heat treatment to form a vitreous layer.

Finally, the invention also provides for the use of the coated inorganic pigments for the production of enamels and mouldings. In order to produce enamel decorations, for example, the inorganic pigment coated in accordance with the invention can be employed instead of or together with customary pigments in conventional enamel pastes.

As a result of the novel coating of the inorganic pigments it is possible a) to protect the inorganic pigments against chemical (oxidation, reduction, decomposition) or physical (melting, sublimation, evaporation, Ostwald ripening) change in the temperature range from 500 to 1200° C. over a period which is sufficient for further processing, so that no change in the optical properties (e.g. colour change) occurs;

b) to produce sufficiently adhesive enamel decorations with high pigment contents of up to 60% by weight;

c) to reduce the heavy metal content of the enamel decoration and/or to reduce the firing temperature of the enamel, since the glass of the coating need only be incipiently melted in order to produce the enamel composite and can have a markedly higher viscosity than in the case of conventional enamels based on glass frits;

d) to increase the firing temperature of enamel decorations with nanoscale pigments (for example those based on noble metal colloids) to temperatures ≦1200° C. by encapsulating the nanoscale pigments in a high-melting matrix sheath; and e) to produce enamels consisting only of free-flowing spherical particles, thereby substantially increasing the ease of processing.

DETAILED DESCRIPTION OF THE INVENTION

Examples of inorganic pigments which are suitable for the purposes of the invention are metal pigments such as Ag, Au, Cu, Fe, Pb, Pd and Pt; and metal-oxide pigments such as $Al_2O_3$, $Fe_2O_3$, $Fe_3O_4$, $Cr_2O_3$, CuO, $Cu_2O$, $In_2O_3$, $Mn_2O_3$, PbO, PdO, $SnO_2$, $TiO_2$, ZnO and $ZrO_2$. Also suitable are metal halides such as AgCl, AgBr, $AgCl_xBr_{1-x}$ and CuCl; metal carbides such as TiC and $B_4C$; metal nitrides such as BN and TiN; metal arsenides such as $Cd_3As_4$; metal phosphides such as $Cd_3P_2$; metal chalcogenides (sulphides, selenides, tellurides) such as AgS, CdS, HgS, PbS, $FeS_2$, MoS and ZnS, CdSe, ZnSe and CdTe and mixed phases such as $ZnSe/PbS_2$ and $CdS/PbS_2$. A further group of suitable pigments includes non-metal pigments, primarily carbon in the form, for example, of graphite or carbon black; non-metal oxide pigments, such as $SiO_2$; and minerals such as micas, spinels, for example magnetite or copper chromium spinel; heavy spar ($BaSO_4$) or fluorspar ($CaF_2$).

The particle size of the inorganic pigments can be in the nanometer range of from 0.5 to 500 nm, preferably from 1 to 100 nm and, in particular, from 1 to 25 nm, or else in the micrometer range of from 0.5 to 100 μm, preferably from 1 to 50 μm and, in particular, from 1 to 5 μm.

In the case of nanoscale pigments it is possible for a plurality of pigment particles to be enclosed by the xerogel or glass coating. The microscopic pigment particles, on the other hand, are preferably coated individually, although a number of pigment particles can also be coated with a common xerogel or glass layer. The geometrical form of the pigment particles is arbitrary, but is preferably spherical. In addition to spherical particles, it is also possible to employ pigment particles in the form of platelets or rods.

The composition of the coating of the novel pigments corresponds to a customary one-component or multi-component glass composition. Examples of suitable one-component systems are $SiO_2$, $TiO_2$ and $ZrO_2$. Multi-component systems which can be used are, for example, two-component systems such as 70–90% by weight $SiO_2$/10–30% by weight $B_2O_3$; three-component systems such as $PbO/B_2O_3/SiO_2$ and $P_2O_5/B_2O_3/SiO_2$; and four-component systems such as 65–92% by weight PbO/5–20% by weight $B_2O_3$/2–10% by weight $SiO_2$/1–5% by weight ZnO. Further examples of suitable glass compositions are given in C. J.

Brinker, G. W. Scherer: "Sol-Gel Science—The Physics and Chemistry of Sol-Gel Processing", Academic Press, Boston, San Diego, New York, Sydney (1990) and in DE 1941191, DE 3719339, DE 4117041 and DE 4217432.

For the preparation of the coated inorganic pigments, one or more glass-forming components are first of all reacted by the sol-gel process to form a sol. This can be carried out, for example, by the methods described in the above-mentioned documents, for example by hydrolysis and condensation of a compound, in liquid form or dissolved in a solvent, of one or more elements from the group consisting of Si, Al, Pb, Bi, P, Ti, Zn and Zr, or a corresponding precondensate, in combination if desired with compounds which are soluble in the reaction medium and comprise at least one element from the group consisting of the alkali metals (e.g. Na, K, Li), alkaline earth metals (e.g. Ca, Mg, Ba) and boron, and in the presence or absence of an acidic or basic condensation catalyst. For further details of the sol preparation, reference is made to the abovementioned publication of C. J. Brinker et al. and to the abovementioned patent documents.

The inorganic pigment or a pigment precursor is then dispersed in the resulting sol, and this dispersion is converted, under the conditions of the subsequent spray drying and heat treatment, into the desired pigment. For this purpose the heat treatment can be carried out, for example, under oxidative or reductive conditions.

Dispersion is preferably effected by ultrasonic disintegration. In the case where nanoscale pigments are used, the dispersions can if desired be stabilized by the addition of appropriate complexing agents.

The sol-pigment dispersion obtained is then spray dried, in the case of aqueous systems preferably at a temperature of from 100 to 150° C. This produces pigment particles which are coated with a xerogel and have a particle size of from 2 to 100 μm, preferably from 2 to 10 μm.

If desired, the xerogel coating can subsequently be densified in a sintering process, at temperatures within the transformation range of the glass composition employed, to form a glass layer. Densification can be carried out in air or, for example, in an inert gas atmosphere.

The heating rate is preferably of the order of a few K per minute up to temperatures at which residual groups resulting from the synthesis (e.g. organic radicals or inorganic radicals such as nitrate groups) escape from the coating. Above this temperature, further densification to the final temperature can be carried out with markedly higher heating rates of up to 100 K/min. The holding time at the densification temperature depends on the temperature of densification and ranges from several minutes up to about 1 hour. If temperatures markedly above the transformation temperature of the glass composition are employed for densification of the glass layer, coalescence of the particles must be prevented by means of appropriate measures (e.g. fluidized bed, fall-through oven).

To produce enamels, the coated inorganic pigments are processed with customary additives, such as glass frit and organic binders, to form enamel pastes which can be processed conventionally into enamel decorations. In place of the glass frit and organic binders it is also possible to use sols or gels of appropriate composition in conjunction with suitable additives for establishing the rheology which is required for the respective decoration technique (e.g. screen printing, offset printing, inkjet process) and/or additives for achieving the adhesion which is required for subsequent processing.

Mouldings can likewise be produced by means of known methods, in accordance with which dry powders, suspensions and pastes having Newtonian or pseudoplastic, thixotropic, rheopexic or dilatant flow properties are processed.

In this context, the glass coating of the novel coated inorganic pigments not only exercises a protective function for the pigment but also takes over the binder function.

The examples which follow illustrate the invention without limiting it.

EXAMPLE 1

Preparation of a composite enamel based on a glass of composition 83.0 PbO-13.0 $B_2O_3$-2.4 $SiO_2$-1.6 ZnO and a pigment (either $CuCr_2O_4$ or $Fe_3O_4$)

Starting materials:
120.0 g of $Pb(NO_3)_2$
4.2 g of zinc acetate dihydrate
600 ml of water
12.0 ml of 0.1 M nitric acid
7.98 g of tetraethoxysilane (TEOS)
37.81 g of trimethyl borate in 24 ml of ethanol
97.4 g of pigment ($CuCr_2O_4$ or $Fe_3O_4$)

120.0 g of lead(II) nitrate and 4.2 g of zinc acetate dihydrate are dissolved in 600 ml of water in a 1000 ml two-necked round-bottomed flask with reflux condenser and dropping funnel. 12.0 ml of 0.1 M nitric acid are added, followed by 7.98 ml of TEOS. After heating to 60° C., 37.81 ml of trimethyl borate in 24 ml of ethanol are added dropwise and the mixture is stirred at the same temperature for three hours. A colourless transparent sol is obtained.

97.4 g of the corresponding pigment are dispersed in this sol by ultrasonic disintegration. The pigment-sol suspension is spray dried at a nozzle temperature of 130° C. A black powder is obtained which includes residual groups resulting from the synthesis, which are removed by a temperature treatment at 475° C. for two hours.

The resulting composite material is screen-printed in the customary manner after the addition of customary screen printing additives. The decoration obtained after firing at temperatures of 500 to 700° C. consists 50% of glass and 50% of pigment.

EXAMPLE 2

Preparation of a composite enamel based on a glass frit of composition 89.6 PbO-5.2 $B_2O_3$-5.2 $SiO_2$ and graphite Starting materials:
26.59 g of $Pb(NO_3)_2$
100 ml of water
2.6 ml of 0.1 M nitric acid
3.61 g of tetraethoxysilane (TEOS)
3.101 g of trimethyl borate in 3.0 ml of ethanol
8.6 g of graphite The preparation of the sol and of the pigment-sol dispersion and its spray drying are carried out as in Example 1. Materials produced using this system can be processed with external firing at temperatures from 500 to 700° C.

EXAMPLE 3

Preparation of composite materials based on borosilicate (15 mol % $B_2O_3$, 85 mol % $SiO_2$)

Starting materials:
7 ml of ethanol
30 ml of 0.15 M HCl
86.8 ml of tetraethoxysilane (TEOS)
35.21 ml of trimethyl borate (TMB)
20 g of magnetite Ethanol, TEOS and half of the required HCl are mixed. After hydrolysis of the TEOS, TMB is added dropwise and the mixture is then stirred at 50° C. for 2 hours. The remaining HCl and the magnetite pigment are then added, and dispersion takes place in an ultrasound bath for 5 minutes. Spray drying is carried out as in Example 1. The coated pigment is then heat-treated at 700° C. in an $N_2$ atmosphere at a heating rate of 1 K/min, with a holding time of 1 h and a cooling rate of about 5 K/min.

EXAMPLE 4

Preparation of a composite enamel based on borosilicate (14 mol % $B_2O_3$, 86 mol % $SiO_2$)

Starting materials:
7 ml of ethanol
34.8 ml of 0.15 M HCl
100.5 ml of tetraethoxysilane (TEOS)
23.8 ml of trimethyl borate (TMB)
20 g of magnetite The preparation of the sol and of the pigment-sol dispersion and its spray drying are carried out as in Example 3. The thermal aftertreatment of the pigment in order to densify the coating, however, takes place at 800° C. in an $N_2$ atmosphere. Because of the coating, the temperature required for oxidation of the magnetite is increased from 280° C. to 780° C. (measured by DTA at a heating rate of 10 K/min in synthetic air).

EXAMPLE 5

Preparation of a composite enamel based on phosphorus borosilicate (10 $P_2O_5$-11 $B_2O_3$-79 $SiO_2$)

Starting materials:
20 ml of ethanol
87.6 ml of 0.15 M HCl
270 ml of tetraethoxysilane (TEOS)
117.7 ml of trimethyl borate (TMB)
27.2 g of $P_2O_5$
50 g of magnetite Ethanol, TEOS and half the required HCl are mixed. After hydrolysis of the TEOS, TMB is added dropwise and the mixture is then stirred at 50° C. for 2 h. Then the remaining HCl, followed by the $P_2O_5$ and, finally, the magnetite pigment are added, and dispersion is carried out in an ultrasound bath for 5 minutes. Spray drying takes place as in Example 1. The coated pigment is then heat-treated at 720° C. in an $N_2$ atmosphere at a heating rate of 1 K/min, with a holding time of 1 h and a cooling rate of about 5 K/min.

EXAMPLE 6

Preparation of a black pigment based on a borosilicate xerogel

Starting materials:
24.28 g of tetraethoxysilane (TEOS)
20 ml of 10% strength acetic acid
8.96 g of trimethyl borate (TMB)

24.28 g of TEOS and 20 ml of 10% strength acetic acid are mixed in a 250 ml single-necked round-bottomed flask with reflux condenser and dropping funnel. After heating to 50° C., 8.96 g of TMB are added dropwise and the mixture is stirred at this temperature for one hour.

The colourless transparent sol thus obtained is dried in a spray dryer at a nozzle temperature of 130° C. In order to prepare the black pigment, consisting of carbon colloids and a borosilicate matrix of composition 70 $SiO_2$-30 $B_2O_3$, this white xerogel powder is heated to 750° C. at a rate of 15 K/min, and held at this temperature for one hour. The temperature treatment can be carried out either in air or in an inert gas atmosphere. The black colouration of the resulting powder derives from carbon colloids which, as a result of incomplete combustion of residual organic groups, remain in the xerogel.

This black pigment can be processed, by adding customary glass frits and screen printing additives, to give a black enamel decoration. In the firing range from 500 to 700° C., no discolourations of the decoration occur with either internal firing or external firing.

EXAMPLE 7

Embedding of Au colloids in an $SiO_2$ matrix

Starting materials:
100 ml of 3-glycidyloxypropyltrimethoxysilane (GPTS)
12.2 ml of water
6.98 ml of 3-aminopropyltriethoxysilane (APTS)
50 ml of ethanol
1.79 g of tetrachloroauric acid hydrate ($H[AUCl_4].H_2O$)

100 ml of GPTS and 12.2 ml of $H_2O$ are mixed in a 250 ml three-necked round-bottomed flask with reflux condenser and dropping funnel. The mixture is then heated at 120° C. for 2 hours and under reflux. In a second mixture in a 100 ml two-necked flask, 1.79 g of $H[AuCl_4].H_2O$ are dissolved in 50 ml of ethanol, and are reacted with 1.16 ml of APTS, added dropwise in a ratio of 1:1, to form a preliminary complex. The gold solution obtained is then carefully stirred into the prehydrolysed GPTS sol. 5.81 ml of APTS are then added slowly dropwise with stirring to the gold-containing GPTS sol, and the finished solution is stirred at room temperature for 10 minutes.

The orange-red, transparent sol thus obtained is dried in a spray dryer at a nozzle temperature of 110° C. In order to prepare the red pigment, consisting of gold colloids and a silicate matrix $SiO_2$, this orange xerogel powder is heated to 1000° C. at a rate of 70 K/h and is held at this temperature for 15 minutes. The temperature treatment is carried out in air. The red colouration of the resulting powder derives from Au colloids in the size range from 2 nm to 50 nm, which have been produced by reduction of the gold ions by the organic constituents of the xerogel.

EXAMPLE 8

Preparation of coated magnetic pigment particles 6 different sols were used. The sols were prepared in accordance with the following schemata:

Sol 1 ($SiO_2$:$B_2O_3$=7:3): The synthesis was carried out in a 250 ml round-bottomed flask with continuous stirring. 86.6 ml of tetraethyl orthosilicate +7 ml of anhydrous non-denatured ethanol +14.1 ml of 0.15 M HCl A two-phase mixture is formed which is stirred at room temperature until it becomes single-phase. This is followed by the dropwise addition of +37.8 ml of trimethyl borate.

The sol is subsequently held at 50° C. for 2 hours. This is followed by the addition of +14.1 ml of 0.15 M HCl.

Sol 2 ($SiO_2$:$B_2O_3$=4:1): The synthesis was carried out in a 250 ml round-bottomed flask with continuous stirring. 100.5 ml of tetraethyl orthosilicate +7 ml of anhydrous non-denatured ethanol +16.3 ml of 0.15 M HCl A two-phase mixture is formed which is stirred at room temperature until it becomes single-phase. This is followed by the dropwise addition of +25.6 ml of trimethyl borate.

The sol is subsequently held at 50° C. for 2 hours. This is followed by the addition of +16.3 ml of 0.15 M HCl.

Sol 3 ($SiO_2$:$B_2O_3$=85:15): The synthesis was carried out in a 250 ml round-bottomed flask with continuous stirring. 107.8 ml of tetraethyl orthosilicate +7 ml of anhydrous non-denatured ethanol +17.5 ml of 0.15 M HCl A two-phase mixture is formed which is stirred at room temperature until it becomes single-phase. This is followed by the dropwise addition of +19.4 ml of trimethyl borate.

The sol is subsequently held at 50° C. for 2 hours. This is followed by the addition of +17.5 ml of 0.15 M HCl.

Sol 4 ($SiO_2:B_2O_3$=4:1; 2 mol % $P_2O_5$): The synthesis was carried out in a 250 ml round-bottomed flask with continuous stirring. 100.5 ml of tetraethyl orthosilicate +7 ml of anhydrous non-denatured ethanol +16.3 ml of 0.15 M HCl A two-phase mixture is formed which is stirred at room temperature until it becomes single-phase. This is followed by the dropwise addition of +25.6 ml of trimethyl borate.

The sol is subsequently held at 50° C. for 2 hours. This is followed by the addition of +16.3 ml of 0.15 M HCl +1.63 g of $P_2O_5$ Sol 5 ($SiO_2:B_2O_3$=4:1; mol % $Al_2O_3$): The synthesis was carried out in a 250 ml round-bottomed flask with continuous stirring. 100.5 ml of tetraethyl orthosilicate +7 ml of anhydrous non-denatured ethanol +16.3 ml of 0.15 M HCl A two-phase mixture is formed which is stirred at room temperature until it becomes single-phase. This is followed by the dropwise addition of +25.6 ml of trimethyl borate.

The sol is subsequently held at 50° C. for 2 hours. This is followed by the addition of +16.3 ml of 0.15 M HCl +3.06 g of $AlCl_3$.

Sol 6 ($SiO_2:B_2O_3$=4:1; mol % $ZrO_2$): The synthesis was carried out in a 250 ml round-bottomed flask with continuous stirring. 100.5 ml of tetraethyl orthosilicate +7 ml of anhydrous non-denatured ethanol +16.3 ml of 0.15 M HCl A two-phase mixture is formed which is stirred at room temperature until it becomes single-phase. This is followed by the dropwise addition of +25.6 ml of trimethyl borate, +5.15 ml of zirconium(IV) propylate, 70% by weight solution in 1-propanol The sol is subsequently held at 50° C. for 2 hours. This is followed by the addition of +16.3 ml of 0.15 M HCl.

After a further 2 hours at 50° C., 22.5 g of mica (Iriodin 600) are stirred into 150 ml of each of the sols, and coating is then carried out with a spray dryer. The nozzle temperature of the spray dryer was 134° C.

The powder obtained by the spray drying process was subsequently heat-treated under a nitrogen atmosphere (90 l/h). The heating rate during this procedure was 1 K/min and the holding time was 2 hours at the maximum temperature reached. This temperature was 750° C. in the case of coating with sol 1, 860° C. in the case of coating with sol 2 and 800° C. in the case of the other coatings. After the sintering process, the furnace was switched off and the powder was cooled to room temperature.

EXAMPLE 9

Preparation of a black pigment based on sol-gel by thermal densification of xerogels of target composition 99.5 $SiO_2$-0.5 $Na_2O$ (percentages by quantity of substance)

Starting materials:
17.84 g of methyltriethoxysilane (MTEOS)
5.20 g of tetraethoxysilane (TEOS)
7.0 ml of silica sol Bayer Levasil 300/30
0.18 ml of conc. nitric acid
114 mg of sodium formate in
0.64 ml of formic acid In a 50 ml glass beaker, 17.84 g of MTEOS and 5.20 g of TEOS are mixed with 7.0 ml of silica sol, and then 0.18 ml of $HNO_3$ is added. After stirring for about 2 minutes, 114 mg of sodium formate in 0.64 ml of formic acid are added. The transparent sol is then stirred at room temperature for 15 minutes and, after stripping off the solvent, the residue is dried in a drying oven at 120° C. for 24 h. The corresponding black pigment is produced from this xerogel by rapid densification at a heating rate of 10 K/min and a target temperature of 750° C. The temperature treatment can be carried out either in air or in a nitrogen atmosphere.

This black pigment can be used for printing by means of screen printing in the conventional manner, with the addition of appropriate glass frits and screen printing oils, and fired. In this context, the temperature depends on the glass used.

EXAMPLE 10

Preparation of an $SiO_2$ powder containing Au colloid and based on GPTS/TEOS

Starting materials:
36 ml of 3-glycidyloxypropyltrimethoxysilane (GPTS)
9 ml of tetraethoxysilane (TEOS)
6.5 ml of 0.1 M nitric acid
1.79 g of tetrachloroauric acid hydrate
$H[AuCl4].H_2O$
80 ml of ethanol
6.67 ml of N-(2-aminoethyl-3-aminopropyl-)-trimethoxysilane (DIAMO)

36 ml of GPTS and 9 ml of TEOS are mixed with 25 ml of ethanol in a 250 ml three-necked round-bottomed flask with reflux condenser and dropping funnel, and the mixture is heated under reflux for 1 h. Then 6.5 ml of 0.1 M nitric acid are slowly added dropwise and the mixture is heated under reflux for 24 h. The resulting GPTS/TEOS sol is diluted with 25 ml of ethanol.

In a second mixture, 1.79 g of $H[AuCl_4].H_2O$ are dissolved in 30 ml of ethanol in a 100 ml two-necked flask, and 1.10 ml of DIAMO are slowly added dropwise with vigorous stirring. A further solution is obtained by adding 5.57 ml of DIAMO to the prehydrolysed GPTS/TEOS sol. This mixture is transferred slowly and with vigorous stirring at room temperature into the gold-containing solution, and the resulting mixture is stirred at room temperature for 15 minutes. The clear, orange-red sol is then carefully concentrated on a rotary evaporator. The pressure is first reduced to 250 mbar, and at the same time the bath temperature is raised from room temperature to 50° C. As soon as no further distillation of solvent can be observed, the pressure is reduced to 150 nbar. The viscous sol which remains is poured into a polypropylene beaker and dried at 40° C. for 8 h. The orange xerogel is then ground, heated to 150° at a rate of 30 K/h and held at this temperature for 3 h. The deep-red powder obtained is ground again and then heated to 1000° C. at a rate of 70 K/h, held at this temperature for 10 minutes and then cooled to room temperature in the closed furnace.

What is claimed is:

1. A coated inorganic pigment composition, comprising an inorganic pigment coated with a glass intact coating having a layer thickness of at least 0.8 μm, wherein said coated inorganic pigment composition is obtained by a process comprising:
   (a) reacting at least one glass-forming component by a sol-gel process to form a sol,
   (b) dispersing an inorganic pigment or pigment precursor in the sol,
   (c) spray drying the sol-pigment dispersion to produce an inorganic pigment coated with a xerogel coating, and
   (d) densifying the xerogel coating by heat treatment to form a vitreous coating layer, wherein the inorganic pigment or pigment precursor is not a spinel.

2. The coated inorganic pigment composition according to claim 1, wherein the pigment is a metal.

3. The coated inorganic composition according to claim 1, wherein the metal is Ag, Au, Cu, Fe, Pb, Pd or Pt.

4. The coated inorganic pigment composition according to claim 1, wherein the pigment is a metal oxide.

5. The coated inorganic pigment composition according to claim 4, wherein the metal oxide is $Al_2O_3$, $Fe_2O_3$, $Fe_3O_4$, $Cr_2O_3$, CuO, $In_2O_3$, $Mn_2O_3$, PbO, PdO, $SnO_2$, $TiO_2$, ZnO or $ZrO_2$.

6. The coated inorganic pigment composition according to claim 1, wherein the pigment is a metal compound.

7. The coated inorganic pigment composition according to claim 6, wherein the metal compound is selected from the group consisting of metal halides, metal carbides, metal nitrides, metal arsenides, metal phosphides and metal chalcogenides.

8. The coated inorganic pigment composition according to claim 1, wherein the pigment is a non-metallic element containing pigment.

9. The coated inorganic pigment composition according to claim 8, wherein the non-metallic element containing pigment is carbon.

10. The coated inorganic pigment composition according to claim 1, wherein the pigment is a non-metal oxide or a mineral.

11. The coated inorganic pigment composition according to claim 10, wherein the non-metal oxide is $SiO_2$ and the mineral is selected from the group consisting of micas, heavy spar and fluor-span.

12. The coated inorganic pigment composition according to claim 1, wherein the uncoated pigment has a particle size of 0.5 nm to 100 $\mu$m.

13. The coated inorganic pigment composition according to claim 1, wherein the coating comprises a one-component or multi-component glass composition.

14. The coated inorganic pigment composition according to claim 1, wherein the coating has a thickness of from 1 to 5 $\mu$m.

15. The coated inorganic pigment composition according to claim 1, wherein the coated pigment has a particle size of from 2 to 100 $\mu$m.

16. The coated inorganic pigment composition according to claim 1, wherein the coating comprises at least one element selected from the group consisting of Si, Al, Pb, Bi, P, Ti, Zn and Zr.

17. The coated inorganic pigment composition according to claim 1, wherein the coating further comprises at least one element selected from the group consisting of alkali metals, alkaline earth metals and boron.

18. A process for the preparing the coated inorganic pigment composition according to claim 1, comprising:

(a) reacting at least one glass-forming component by a sol-gel process to form a sol, (b) dispersing an inorganic pigment or a pigment precursor in the sol, (c) spray drying the sol-pigment dispersion to produce an inorganic pigment coated with a xerogel coating, and (d) densifying the xerogel coating by heat treatment to form a vitreous coating layer.

19. The process of claim 18, wherein the inorganic pigment or pigment precursor is not a spinel.

* * * * *